United States Patent [19]

Kerner et al.

[11] 4,212,855
[45] Jul. 15, 1980

[54] PROCESS FOR PRODUCING CONCENTRATED SULFURIC ACID

[75] Inventors: Walter Kerner, Huerth-Hermuehlheim; Paul Schmitz, Noervenich-Dorweiler, both of Fed. Rep. of Germany

[73] Assignee: Davy Powergas GmbH, Cologne, Fed. Rep. of Germany

[21] Appl. No.: 912,644

[22] Filed: Jun. 5, 1978

[30] Foreign Application Priority Data

Jun. 4, 1977 [DE] Fed. Rep. of Germany ....... 2725432

[51] Int. Cl.² .................... C01B 17/72; C01B 17/50
[52] U.S. Cl. .................................. 423/522; 423/540; 423/542
[58] Field of Search ............. 423/522, 531, 532, 540, 423/542, 533

[56] References Cited

U.S. PATENT DOCUMENTS

| | | | |
|---|---|---|---|
| 1,447,645 | 3/1923 | Chase et al. | 423/542 |
| 1,823,372 | 9/1931 | Merriam | 423/522 |
| 2,091,943 | 8/1937 | Gilchrist et al. | 423/540 |
| 2,629,651 | 2/1953 | Merriam et al. | 423/533 |
| 3,907,979 | 9/1975 | Jenniges | 423/522 |

FOREIGN PATENT DOCUMENTS 1061304 7/1959 Fed. Rep. of Germany ........... 423/542
2417005 10/1975 Fed. Rep. of Germany ........... 423/522

Primary Examiner—O. R. Vertiz
Assistant Examiner—Gary P. Straub
Attorney, Agent, or Firm—Millen & White

[57] ABSTRACT

An improved process for the production of concentrated sulfuric acid from $H_2O$- and $SO_2$-containing gases by the oxidation of the $SO_2$ thereof in a plurality of contact stages while lowering the temperature of the gases, thereby condensing the sulfuric acid therefrom, comprises cooling a portion of the sulfur dioxide-containing gases exiting from a combustion or cracking furnace by contacting them with cooling water, the water vapor contained in the gases thereby being partially condensed-out or separated-off. The resulting cooled gases with reduced steam content are recycled into the furnace and, by the selection of the cooling temperature of the recycled gas, the $H_2O/SO_2$ mol ratio in the combustion or cracking gases is adjusted within the range of from 1.0 to 1.25, and the remaining portion of the sulfur dioxide-containing gases, i.e., those which are not recycled, is fed to contact oxidation stages.

10 Claims, 2 Drawing Figures

PROCESS FOR PRODUCING CONCENTRATED SULFURIC ACID

BACKGROUND OF THE INVENTION

This invention relates to an improved process for the production of concentrated sulfuric acid from moist, $SO_2$-containing gases, formed in a furnace by the combustion of $H_2S$-containing gases or by the thermal cracking of aqueous waste sulfuric acid, wherein the $SO_2$-containing gases are cooled to a temperature within the range of from 400° to 480° C. The $SO_2$ contained in the gases is oxidized to $SO_3$ in a plurality of contact stages while lowering the temperature of the gases between the stages and absorbing the sulfur trioxide and water vapor, thereby forming sulfuric acid.

Moist, $SO_2$-containing gases are obtained during the combustion of $H_2S$-containing gases or during the thermal cracking of aqueous spent sulfuric acid. It is known to initially dry these moist, $SO_2$-containing gases and then to convert them catalytically to sulfuric acid. Drying of the hot combustion or cracking gases presupposes cooling and subsequent re-heating of the gases to the contact temperature.

It is also known to subject the moist gases to contact oxidation without previous drying and to form sulfuric acid by condensation of the $SO_3$ and water vapor-containing contact gas. However, with this arrangement, there is obtained aqueous sulfuric acid, generally containing 78 to 80% by weight of $H_2SO_4$, which corresponds to the moisture content of the gas. The possibilities for utilization of this aqueous sulfuric acid are limited. Additionally, it is also known to effect acid formation in the condensation stage at temperatures which are so high that the water vapor partially escapes out of the condensation stage with the waste gas, whereby a highly concentrated acid is produced. This mode of operation causes considerable material and operational problems due to the circulation of hot sulfuric acid in the condensation stage.

The underlying problem which this invention solves is the processing of moist, sulfur dioxide-containing gases, which are available at high temperature (such as for example $H_2S$-combustion gases or spent sulfuric acid cracking gases), into concentrated sulfuric acid having more than 95% by weight of $H_2SO_4$, without incurring the result that, due to previous drying, the gas is heated due to indirect heat exchange and/or the acid condensation effected after contact oxidation is conducted at increased temperature, i.e., generally above 90° C., whereby corrosion problems can arise.

SUMMARY OF THE INVENTION

According to the process of this invention, the aforesaid problem is solved by cooling a portion of the sulfur dioxide-containing gases exiting from the combustion or cracking furnace by contacting them with cooling water. The water vapor contained in the gases is thereby partially condensed-out and separated-off, the resulting cooled gases with reduced steam content are recycled into the furnace and, by the selection of the cooling temperature of the recycled gas, the $H_2O/SO_2$ mol ratio in the combustion or cracking gases is adjusted within the range of from 1.0 to 1.25. The remaining portion of the sulfur dioxide-containing gases, i.e., those which are not recycled, is fed to contact oxidation stages. As a result of the recirculation of a portion of the furnace waste gases and maximum removal of the water vapor from the recycle gases, the moisture content in the furnace waste gas is reduced to the value required to produce concentrated sulfuric acid. Thus, subsequent to the contact oxidation stages, the sulfur trioxide formed can, together with the residual water vapor, be condensed to a sulfuric acid having an $H_2SO_4$ content of 95 to 99% by weight. As a result of the return into the furnace of the gases with reduced water-vapor content, a reduction of the temperature of the combustion or cracking feed gases to the inlet temperature of the first oxidation contact stage is also achieved, with the amount of recirculated gas being proportionately greater for higher furnace gas temperatures. Heating of the cooled gas to the contact temperature by indirect heat exchange with the associated risk of corrosion, is thereby avoided.

DETAILED DISCUSSION

In a preferred embodiment of the process of this invention, the portion of gases which is recirculated is such that the temperature of the mixture of hot combustion gases and the cooled recirculation gases is 400° to 480° C. Also according to a preferred embodiment the recycle gases are cooled to a temperature within the range of 0° to 40° C. The proportion of the gases which are recycled is a function of the temperature of the hot combustion gases. The temperature to which the recycle gases are cooled depends on how much water vapor must be condensed out of the gas to produce the desired acid concentration. Since two independently selectable operating variables are available, viz., proportion of gases which are recycled and the temperature of the recycled gases, it is possible, in addition to regulating the $H_2O/SO_2$ ratio, to also regulate the temperature of the gas flowing to the first $SO_3$ oxidation contact stage. The temperature of the contact gas can be increased by reducing the proportion of gases which are recycled and/or increasing the recycle gas temperature, whereas the $H_2O/SO_2$-ratio of the contact gas can be reduced by increasing the gas proportion of gases which are recycled and/or reducing the recycle gas temperature. Thus, one skilled in the art can remove from the furnace gas, the amount of water vapor required in any specific case without the necessity of heating-up a cooled gas containing residual moisture once again in a heat exchanger to the required contact inlet temperature. Due to the mode of operation according to this invention, it also is not necessary to cool the hot combustion or cracking gas to the contact inlet temperature in a waste-heat boiler, this being a mode of operation which, due to the moisture content and slight sulfur trioxide and other contaminants content involved, may lead to disturbances in the waste-heat boiler during continuous operation.

According to a special embodiment of the process of this invention, the contact gas is fed without cooling from an intermediate point in the contact stages to an intermediate absorption point where the sulfur trioxide formed in the first contact stage or stages and the water vapor are condensed therefrom and the waste, i.e., residual gas, from this intermediate absorption point is then heated, by heat exchange with the process gas from the last and the first or second contact stage, to the desired inlet temperature of the last contact stage. Due to the partial drying of the $SO_2$-containing gas, according to the process of this invention, it is also possible to operate the moist gas catalysis with a double absorption system, without incurring special corrosion problems. Since the water vapor content was, prior to contacting, reduced to the value necessary for acid formation, the reaction heat can, subsequent to the first contact stage, be employed for heating the waste gas from intermediate absorbtion, without falling below the acid dew point during this heat exchange. In the intermediate absorber, the moisture is, together with the sulfur trioxide formed, removed from the contact gas and sulfur acid mist is separated out of the gas, so that a moisture- and sulfuric acid mist-free gas is heated to the inlet temperature of the last contact stage. The heat released, upon contact subsequent to intermediate absorption in the now dry gas, is initially transferred in the final heat exchanger to the gas arriving from the intermediate absorber. Thus, dry gases are flowing on both sides of the walls of this heat exchanger. This partially heated gas is then further heated to the inlet temperature of the last contact stage, in an intermediate heat exchanger, by the hot gas which still contains water vapor from the first or second contact stage. With this arrangement, however, the wall temperature of the intermediate heat exchanger is above the sulfuric acid dew point of the hot contact gas flowing in the tubes. After the second or first contact stage, re-cooling is expediently effected by admixture with undried air; and cooling of the contact gas prior to inflow into the intermediate absorption zone is entirely eliminated.

Expediently, the recirculated portion of the $H_2S$ combustion or acid cracking gases is fed into the furnace downstream of the $H_2S$ combustion or acid cracking zone. The cold recirculation gas is already mixed in the lined furnace with the combustion or cracking gas, so that the mixed gas already has at the furnace outlet the inlet temperature of the first contact stage; and the gas in the lines, from furnace to contact apparatus or to the acid cooling stage, remains reliably above the acid dew point.

Expediently, subsequent to contacting the recycle gas, the cooling water is re-cooled by indirect heat exchange and then re-introduced into the recycle gas cooling stage. The re-cooling of the cooling water is usually effected by indirect heat exchange with cold water. However, the temperature to which the recycle gas must be cooled can sometimes be so low that the cooling water circulating through the gas cooling stage must be cooled by heat exchange with a coolant, below the temperature normally achievable during re-cooling. As a rule, the circulating cooling water will then be cooled with a coolant from a refrigeration plant, if its inlet temperature in the gas-cooling stage must be within the range of about 0° to 25° C.

Since the combustion or cracking gas frequently contains some sulfur trioxide which is taken up by the cooling water, during continuous circulation, there is produced a dilute acid containing 0 to 10% by weight $H_2SO_4$ which additionally contains small quantities of sulfur dioxide in dissolved form. Therefore, advantageously, a portion of the cooling water or of the dilute acid produced is withdrawn from the cooling water cycle, degassed with air and the $SO_2$-containing air thus obtained is employed for the contact oxidation, preferably for the blowing-in of air downstream of the contact layers. In this manner, the dilute acid concentration in the cooling stage of the re-circulation gas is kept at a low level and also the sulfur dioxide taken up by the dilute acid is made useful for the sulfuric acid production.

DESCRIPTION OF DRAWINGS

The invention is described in detail hereinbelow with reference to the drawings, in which.

DETAILED DESCRIPTION OF THE OPERATION

Figure 1:
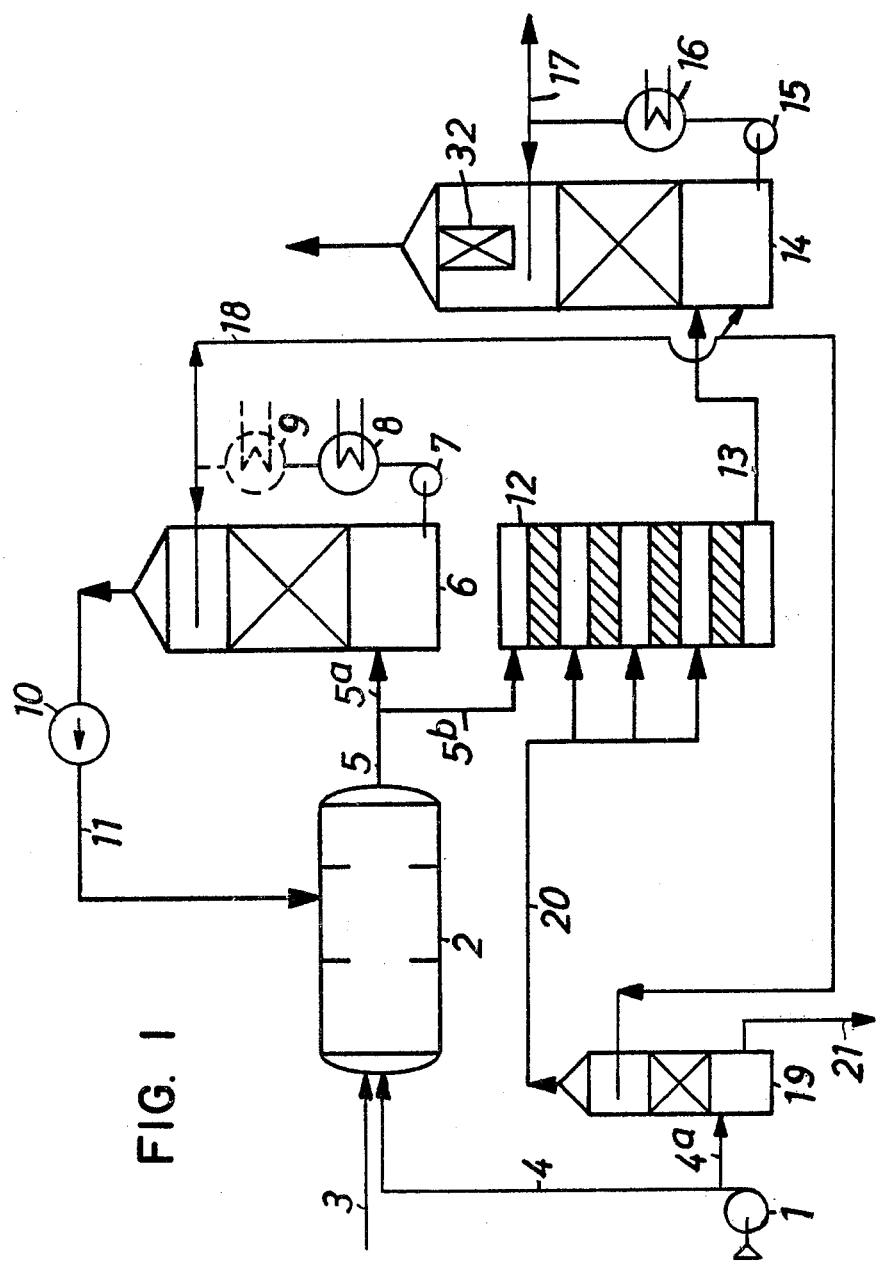
FIG. 1 is a flow diagram of an installation for the carrying into effect of the process according to the invention, using a contact installation with single absorption.

Referring to FIG. 1, in an $H_2S$ combustion furnace 2 an $H_2S$-containing gas fed through line 3 is burned with air fed from blower 1 through line 4. The moist $SO_2$-containing combustion gas leaves the furnace through line 5 and is divided into partial streams through the line $5^a$ or $5^b$. Partial stream $5^a$ flows into a cooling tower 6 containing a packing layer trickled with acid cooling water. The cooling water is continuously circulated by pump 7 through a cooler 8 and the cooling tower 6. Optionally associated with the cooling water circuit is a heat exchanger 9 (shown in broken lines), which is cooled by a coolant from a refrigeration plant (not shown) and is used when the cooling water temperature is to be lowered below 25° C. The gas stream cooled in the cooling tower and correspondingly partially dried by water condensation is recycled by a moist gas blower 10 through a line 11 into combustion furnace 2. The ratio of the partial streams through the lines $5^a$ and $5^b$ and the temperature of the partial stream at the outlet of cooling tower 6 are adjusted so that the gas in line 5 has the moisture or temperature necessary for contacting and the desired acid concentration.

The moist, $SO_2$-containing partial stream through line $5^b$ flows into contact apparatus 12. Conversion is effected in four contact layers, downstream of which in each particular instance, there is blown-in $SO_2$-containing air for cooling purposes, the origin of which is described hereinbelow. The finally contacted gas passes through a line 13 into an absorption tower 14 in which the steam and the sulfur trioxide formed are absorbed out of the gas while forming sulfuric acid, e.g., 96 to 98%, which is continuously circulated through a pump 15 and an acid cooler 16. The product acid is withdrawn at line 17. The final gas passes over a Brink Mist Filter 32 to a chimney or stack (not shown).

From the cooling water circuit of the cooling tower 6, acid cooling water is withdrawn continuously or intermittently and in a degassing tower 19, is subjected to the action of air fed through line $4^a$. The $SO_2$ dissolved in the water is stripped therefrom as follows: the air charged with $SO_2$ is blown-in as cooling air via line 20, in each particular instance between the contact layers of contact apparatus 12. The acid-containing water withdrawn via line 18 from the cooling water circuit 6, 7, 8 or the degassed waste water arriving at 21, can if appropriate be partially introduced into the absorption tower 14.

Figure 2:
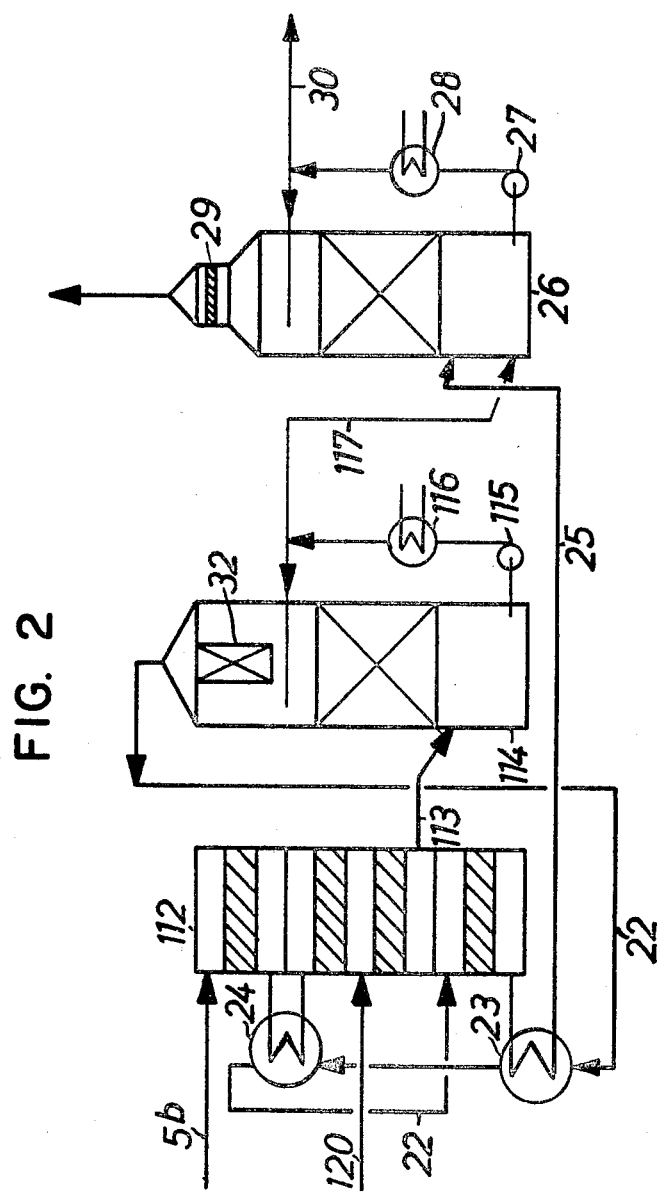
FIG. 2 is a flow diagram of an alternative contact installation having double absorption, which can be employed instead of the contact installation shown in FIG. 1.

Referring to the embodiment shown in FIG. 2, here also the moist $SO_2$-containing gas from furnace 2 (not shown) passes through line $5^b$ into a four-stage contact apparatus 112 and after conversion in the first three stages, withdrawn through line 113 and flows uncooled into the intermediate absorption tower 114, where the water vapor and the sulfur trioxide are absorbed by sulfuric acid with the formation of 96 to 98% $H_2SO_4$. The sulfuric acid is circulated by pump 115 to acid cooler 116. The gas leaves the intermediate absorption tower 114 via a Brink Mist Filter 132 and flows through line 22, via a final heat exchanger 23 and an intermediate heat exchanger 24, into the last contact stage of the contact apparatus 112, in which the sulfur dioxide contained in the gas is oxidized. The contact gas passes, subsequent to cooling in the final heat exchanger 23, throug line 25 into a final absorption tower 26 which is charged with acid, fed via line 117, from the intermediate absorption tower 114. The acid is withdrawn from the final absorption tower 26 and pumped by a pump 27 through an acid cooler 28 back to tower 26. The product acid is withdrawn from line 30 as 98 to 98.8% $H_2SO_4$. The tail gas leaves the final absorption tower 26 via a wire mesh filter 29 to a stack (not shown). The dry, mist-free waste gas from the intermediate absorption tower 114 is heated by the dry gas exiting from the last contact stage in heat exchanger 23 and subsequently by the moist contact gas from the first contact stage in heat exchanger 24 to the temperature of the last contact stage.

With this arrangement, there is no temperature decrease below the acid dew point in the tubes of the heat exchanger 24 through which the hot contact gas flows. For cooling the contact gas, atmospheric air is blown by a blower (not shown) through line 120 into contact apparatus 112 downstream of the second contact stage.

Without further elaboration, it is believed that one skilled in the art can, using the preceding description, utilize the present invention to its fullest extent. The following preferred specific embodiment is, therefore, to be construed as merely illustrative and not limitative of the remainder of the disclosure in any way whatsoever.

EXAMPLE 1,255 $Nm^3$/hr. of moist $H_2S$-containing gas containing 43.5 vol. % $H_2S$, 4.4 vol. % $H_2O$, are burned with 6,550 $Nm^3$/hr. undried air containing 20 g. $H_2O/Nm^3$. 19,140 $Nm^3$/hr. of recirculation gas (i.e., 225 vol. % of the combustion gas) are cooled to 36° C. by contacting with water cooled to 33° C., thereby reducing the water content from 115 to 68 g. $H_2O/Nm^3$. The partially dried gas is recycled to the combustion furnace. The non-recycle gas, i.e., 8.035 $Nm^3$/hr., containing 6.82 vol. % $SO_2$, 8.24 vol. % $H_2O$, and 6.3 vol. % $O_2$, is oxidized in the four-stage contact plant shown in FIG. 1. Subsequently, the sulfur trioxide and the water vapor are absorbed in approximately 98% sulfuric acid. There is obtained 2.51 metric tons/hr. of 98% sulfuric acid.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for producing concentrated sulfuric acid from hot starting $H_2O$- and $SO_2$-containing gases having an $H_2O/SO_2$ molar ratio above 1.25, the gases being formed by the combustion of $H_2S$-containing gases or by the thermal cracking of aqueous waste sulfuric acid in a combustion or thermal cracking zone, and the process comprising:

cooling the hot starting gases to a temperature of from 400° to 480° C. and lowering their water content;

oxidizing the $SO_2$ in the gases to $SO_3$ in a plurality of contact stages, including a first stage, a last stage and at least one intermediate stage;

cooling the gases between the contact stages; and absorbing the sulfur trioxide and water vapor to form sulfuric acid;

the improvement which comprises effecting the cooling of the hot starting gases produced in the combustion or thermal cracking zone and the lowering of the water content thereof by:

splitting the $H_2O$- and $SO_2$-containing gas stream emanating from the combustion or thermal cracking zone into two gas streams;

feeding one of said two split gas streams into the first contact stage;

cooling the other of said two split gas streams by contacting the gases thereof with an amount of cooling water effective to condense a portion of the water vapor contained in the gases;

separating the condensed water from said gases;

recycling the thus cooled gas stream having lowered water vapor content back to the gas stream emanating from the combustion or thermal cracking zone, such that the recycled cooled gases are mixed with the starting hot gases produced in the zone prior to the point at which said starting hot gases are split into two streams;

the portion of the water vapor condensed in the cooling step and the proportion of gases split into said two split streams being such that the $H_2O/SO_2$ molar ratio and the temperature of the gases fed into the first contact stage are 1.0 to 1.25 and 400°–480° C., respectively.

2. A process according to claim 1 wherein the starting gases are produced in a furnace having a gas outlet to which the cooled portion of the gases are recycled, thus achieving a resultant gas temperature of 400°–480° C.

3. A process according to claim 1 wherein the temperature of the said cooled split gas stream is 0° to 40° C.

4. A process according to claim 1 which further comprises, at an intermediate point in the contact stages, feeding the uncooled contact gas resulting from the stage immediately prior to the intermediate point, into an intermediate absorption stage where sulfur trioxide and water vapor are removed therefrom; heating the residual gas from the intermediate absorption stage by heat exchange with the contact gas out of the last and the first or second contact stage to the inlet temperature of the last contact stage; then contacting the heated residual gas in the last contact stage and absorbing the formed $SO_3$ therefrom.

5. A process according to claim 1 wherein the starting gases are produced in a furnace and the recycled gases are introduced into the furnace downstream of the point where the $H_2S$ combustion or acid cracking occurs therein.

6. A process according to claim 1 wherein the cooling water, after being heated by being contacted with the split gas stream being cooled, is re-cooled by indirect heat exchange and then re-troduced into the recycle gas cooling stage.

7. A process according to claim 6 wherein a portion of the recycling cooling water is withdrawn from the cooling water cycle and degassed by air and the resulting $SO_2$-containing air is used for the contact oxidation.

8. A process according to claim 7 wherein the resulting $SO_2$-containing air is used to supply air between the contact layers.

9. A process according to claim 2 wherein the temperature of the cooled gas stream is 0° to 40° C. and which further comprises, at an intermediate point in the contact stage, feeding the uncooled contact gas resulting from the stage immediately prior to the intermediate point, into an intermediate absorption stage where sulfur trioxide and water vapor are removed therefrom; heating the residual gas from the intermediate absorption stage to the inlet temperature of the last contact stage; then contacting the heated residual gas in the last contact stage and absorbing the formed $SO_3$ therefrom.

10. A process according to claim 9 wherein the cooling water, after being heated by being contacted with the split gas stream being cooled, is re-cooled by indirect heat exchange and then re-introduced into the recycle gas cooling stage.

* * * * *